US008887785B2

(12) United States Patent
Goth

(10) Patent No.: US 8,887,785 B2
(45) Date of Patent: Nov. 18, 2014

(54) AWNING CONTROL WITH MULTIDIMENSIONAL MOTION SENSING

(75) Inventor: Mark Goth, Loveland, CO (US)

(73) Assignee: Carefree/Scott Fetzer Co., Broomfield, CO (US)

( * ) Notice: Subject to any disclaimer, the term of this patent is extended or adjusted under 35 U.S.C. 154(b) by 283 days.

(21) Appl. No.: 12/853,299

(22) Filed: Aug. 10, 2010

(65) Prior Publication Data

US 2011/0048651 A1 Mar. 3, 2011

Related U.S. Application Data

(60) Provisional application No. 61/233,083, filed on Aug. 11, 2009.

(51) Int. Cl.
*G05B 19/042* (2006.01)
*E04F 10/06* (2006.01)

(52) U.S. Cl.
CPC ........ *G05B 19/0428* (2013.01); *E04F 10/0614* (2013.01); *E04F 10/0618* (2013.01); *E04F 10/0625* (2013.01); *E04F 10/0659* (2013.01); *E04F 10/0688* (2013.01); *G05B 2219/23227* (2013.01); *G05B 2219/2653* (2013.01)
USPC ................................. 160/66; 160/7

(58) Field of Classification Search
CPC .......................... E04F 10/0659; E04F 10/0692
USPC ............. 160/1, 7, 70, 60, 66, 67, 68, 69, 310, 160/22, 78, 79, 55, 65
See application file for complete search history.

(56) References Cited

U.S. PATENT DOCUMENTS

| 3,847,171 | A | * | 11/1974 | Akers et al. | 160/68 |
| 4,615,371 | A | * | 10/1986 | Clauss | 160/22 |
| 4,981,552 | A | * | 1/1991 | Mikkor | 438/52 |
| 5,225,748 | A | * | 7/1993 | Haring | 318/266 |
| 6,095,221 | A | * | 8/2000 | Frey, Jr. | 160/67 |

(Continued)

FOREIGN PATENT DOCUMENTS

| EP | 1659256 A2 * | 5/2006 | ............... E06B 9/68 |
| EP | 2003264 A2 | 12/2008 | |

OTHER PUBLICATIONS

Australian patent application No. 2010212268, Examiner's Report dated May 30, 2011, 5 pages.

*Primary Examiner* — Katherine Mitchell
*Assistant Examiner* — Scott Denion
(74) *Attorney, Agent, or Firm* — Tarolli, Sundheim, Covell & Tummino LLP

(57) ABSTRACT

An awning control system provides automatic retraction of an extended awning upon detection of awning motion in multiple dimensions caused by windy conditions. The awning control system includes a micro-electro-mechanical system (MEMS)-based accelerometer for motion-based auto-retraction. A single, combined motion sensor/controller module may be located in the motor head and connected to switches and a 12V power source through wires routed along or within the awning framework. The control system operates by gauging the vertical, horizontal (inward/outward), and lateral motion of the leading edge or lead rail of the awning when in a fully or partially extended position. When persistent motion or gust exceeds preset thresholds, the control system will automatically engage the motor to retract the awning. The control system provides full automatic retraction of the awning unless halted or interrupted by additional user input. Manual switching also controls the extension and retraction of the awning.

25 Claims, 14 Drawing Sheets

(56) References Cited

U.S. PATENT DOCUMENTS

| | | | |
|---|---|---|---|
| 6,230,783 B1 * | 5/2001 | Frey, Jr. | 160/67 |
| 6,273,172 B1 * | 8/2001 | Frey | 160/67 |
| 6,276,424 B1 * | 8/2001 | Frey, Jr. | 160/67 |
| 6,341,638 B1 * | 1/2002 | Thompson et al. | 160/67 |
| 6,732,018 B2 * | 5/2004 | Osinga | 700/275 |
| 6,843,301 B2 * | 1/2005 | Carrillo et al. | 160/310 |
| 6,971,433 B2 * | 12/2005 | Wagner et al. | 160/67 |
| 7,225,251 B2 * | 5/2007 | Suzuki | 709/224 |
| 7,242,162 B2 * | 7/2007 | Goth | 318/480 |
| 7,604,036 B2 * | 10/2009 | Thompson et al. | 160/22 |
| 7,729,807 B2 * | 6/2010 | Guillemot et al. | 700/275 |
| 8,316,910 B2 * | 11/2012 | Popa et al. | 160/70 |
| 2004/0031321 A1 * | 2/2004 | Orsat | 73/170.01 |
| 2004/0045683 A1 * | 3/2004 | Carrillo et al. | 160/310 |
| 2004/0159407 A1 * | 8/2004 | Girard et al. | 160/66 |
| 2004/0221965 A1 * | 11/2004 | Wagner et al. | 160/67 |
| 2005/0282668 A1 * | 12/2005 | Ali et al. | 474/101 |
| 2006/0113936 A1 * | 6/2006 | Goth | 318/280 |
| 2007/0113988 A1 * | 5/2007 | Thompson et al. | 160/70 |
| 2008/0052702 A1 * | 2/2008 | Chuang | 717/170 |
| 2008/0163685 A1 | 7/2008 | Lapierre | |
| 2011/0048655 A1 * | 3/2011 | Andreasen et al. | 160/310 |
| 2011/0162861 A1 * | 7/2011 | Borinato et al. | 173/176 |
| 2012/0298315 A1 * | 11/2012 | Marquez et al. | 160/1 |

\* cited by examiner

AWNING CONTROL WITH MULTIDIMENSIONAL MOTION SENSING

CROSS REFERENCE TO RELATED APPLICATIONS

This application claims the benefit of priority pursuant to 35 U.S.C. §119(e) of U.S. provisional application No. 61/233,083 filed 11 Aug. 2009 entitled "Awning control with multidimensional motion sensing," which is hereby incorporated herein by reference in its entirety.

TECHNICAL FIELD

The technology described herein relates to control systems for retractable awnings.

BACKGROUND

Many retractable awning systems, for example, as mounted on the sides of motor homes or over patios or windows, have automatic retraction systems that activate a motor or retract the awning under severe wind conditions that might damage the awning framework, fabric, or structure to which the awning is mounted. Current motion-based, auto-retraction control systems for automatic awning retraction consist of separate modules for motor control, radio frequency interface, and motion sensing. Further, such systems can only detect severe motion of the awning (e.g., due to wind gusts) in a single dimension.

The information included in this Background section of the specification, including any references cited herein and any description or discussion thereof, is included for technical reference purposes only and is not to be regarded subject matter by which the scope of the invention is to be bound.

SUMMARY

The awning control system described herein provides for automatic retraction of an extended awning upon detection of awning motion in multiple dimensions caused by windy conditions. The awning control system includes a micro-electromechanical system (MEMS)-based accelerometer technology for motion-based auto-retraction. The motion sensor may be located in the motor head. The control system operates by gauging the vertical, horizontal (inward/outward), and lateral motion of the leading edge or lead rail of the awning when in a fully or partially extended position. When persistent motion exceeds a factory preset threshold, the control system will automatically engage the motor to retract the awning. A single sensor/controller module may be located in the motor head and connected to switches and a 12V power source through wires routed along or within the awning framework. Manual switching may also be used to control the extension and retraction of the awning. The control system may provide for full automatic retraction of the awning unless halted or interrupted by additional user input.

In one implementation, the entire control system is provided in a single physical device, inclusive of the motion sensor, located in the leading edge of an awning. User input options may include extension and retraction awning operation via a hardwired switch or radio frequency remote control. The control system may also accept user input of a motion sensitivity level control for the threshold for auto-retraction.

In another embodiment, the accelerometer-based motion sensor may be provided as a replacement for current piezo-electric-based motion sensors in mass-spring-based accelerometers. The accelerometer-based replacement control system may be a plug-and-play replacement component with the added functionality of multi-axis motion sensing. This new accelerometer-based system enhances the current functionality to allow measurement of lateral, horizontal, and vertical awning motion. The output signal may be formed as a scaled, "anemometer-like" switched transistor output that is essentially the same output of anemometers and piezoelectric sensors, but may also be provided as a proportional signal resulting from multi-axis awning motion measurement.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention is provided in the following written description of various embodiments of the invention, illustrated in the accompanying drawings, and defined in the appended claims.

DETAILED DESCRIPTION

An electrical control system incorporating a multidimensional motion detector may be used as an auto-retract awning control module. The control system combines motor control and motion sense modules into a single module installation in the awning. Installation may be as simple as affixing the single module within the cast gearbox housing or otherwise to the leading edge rail of the awning. The single module offers a significantly easier installation over current products.

The control system may use motor current monitoring for auto-shutoff upon full awning retraction. A rocker switch may be used to operate the awning, for example, via a press-and-hold for extension and a single press for retraction. The control system may have a single fixed motion sensitivity trigger level. Radio frequency control and "auto-extend" or "one-touch extend" functionality may be incorporated as optional features. The control system may be provided as a potted assembly with wire leads for connectivity.

The control system may be retrofitted into existing 12V motorized awnings by using the existing motor cable as a 12V power connection and may use a second 3-conductor cable for the switch interface if desired. The control system may be paired with a power on/off switch to disable awning operation during transit as well as to disable the motion detection response feature if so desired.

Figure 1A:
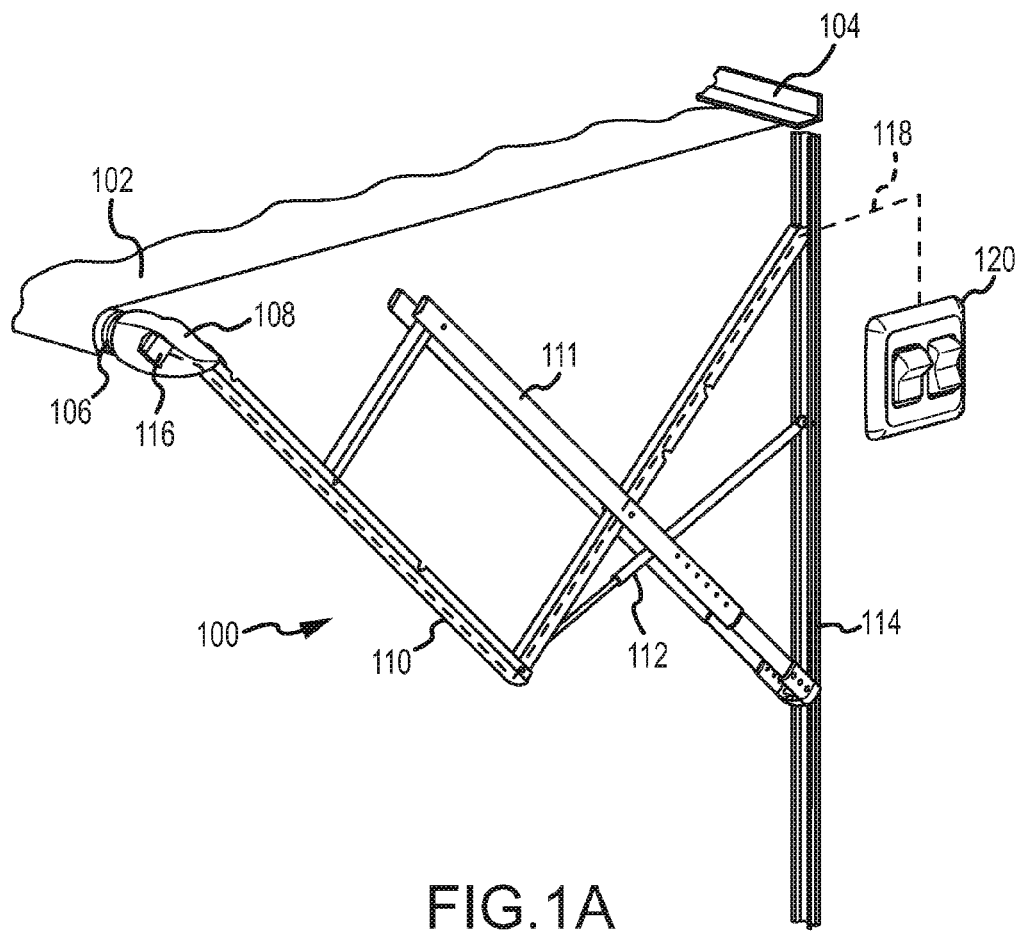
FIG. 1A is a schematic diagram of an implementation of a retractable awning equipped with a multidimensional motion detector.

FIG. 1A is a schematic diagram of an implementation of a retractable awning 100 equipped with a multidimensional motion detector. In FIG. 1A, the awning 100 is shown partially extended with the single motion sensor/motor control module 116 located on the leading edge of the awning 100. In this implementation, the awning canopy 102 is attached to the side of a camper or other recreational vehicle (RV) or a wall of a structure by a mounting rail 104. The awning canopy 102 unfurls from a roller 106 that is mounted on a pair of scissor arms also attached to the RV on a vertical rail 114. Each scissor arm is composed of two articulating parts, a stationary arm 110, which is hinged at a fixed location on the vertical rail 114, and a sliding arm that slides along the vertical rail. The stationary arm 110 may be attached to a gas shock 112 that resists retraction of the awning 100 and provides an assistive force during the extension of the awning 100. In this embodiment, the motor head assembly 108 is located on the leading edge of the awning 100 to directly drive the roller. The control module 116, including the digital accelerometer, is located within the motor head assembly 108. A lead wire assembly 118 extends from the control module 116, along the stationary arm 110, and to an actuation switch 120 for manual activation of the motorized extend and retract functions of the awning 100.

Figure 1B:
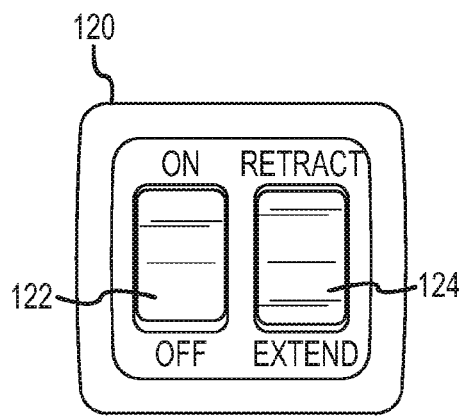
FIG. 1B is a front elevation view of an implementation of a control switch for the retractable awning of FIG. 1A.
Figure 1C:
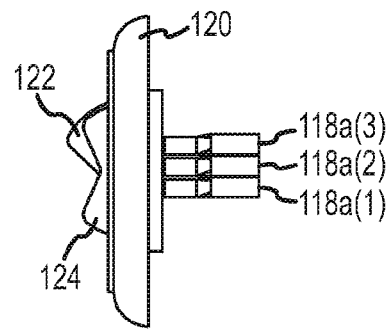
FIG. 1C is a side elevation view of an implementation of a control switch for the retractable awning of FIG. 1A.
Figure 10:
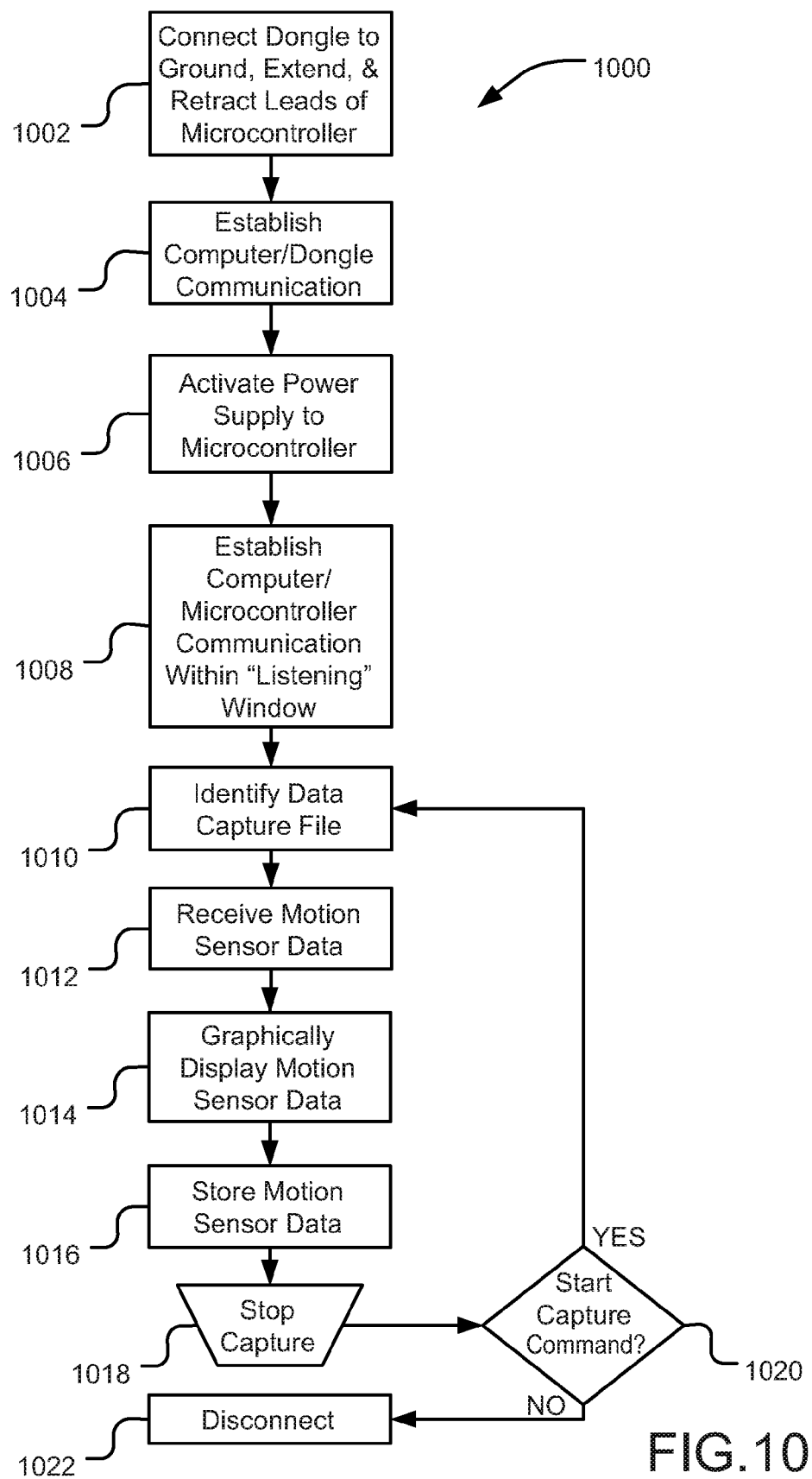
FIG. 10 is a flow diagram of an exemplary control process for receiving real-time motion sensor date from a potted microcontroller of an awning control system.

FIGS. 1B and C depict an implementation of the actuation switch 120 for the retractable awning 100 of FIG. 1A. As shown in FIG. 1B, several manual control options for the awning may be provided including a single, pole single throw (SPST) system power switch 122 and a single pole, double throw (SPDT) momentary rocker switch 124 for extension or retraction the awning 100. FIG. 10 depicts several of the lead wires from the lead wire assembly 118 connected to the rocker switch 124. A first control wire 118a(1) is used to send a retract signal to the control module 116. A second control wire 118a(2) is a common wire to the rocker switch 124 and is connected to a power supply via the control module 116. A third control wire 118a(3) is used to send a retract signal to the control module 116.

Figure 1D:
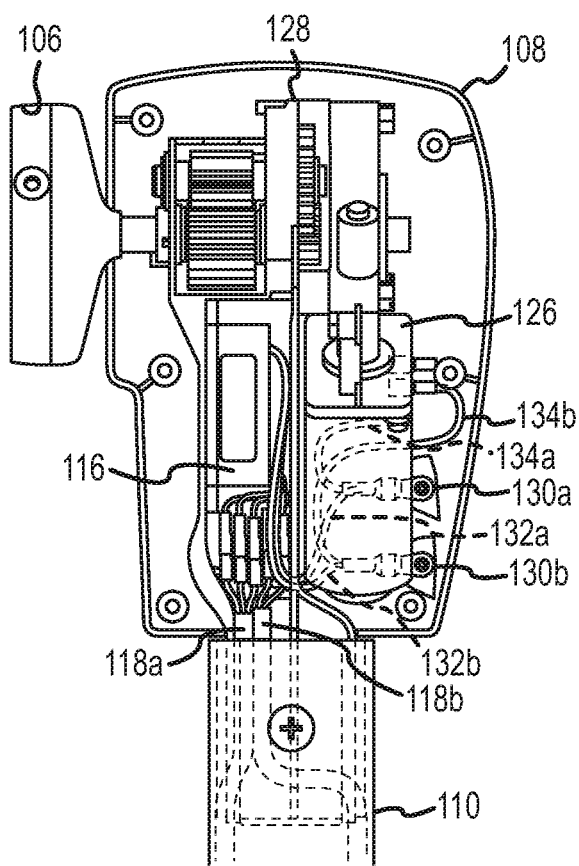
FIG. 1D is a front plan view of a motor head assembly on the leading edge of the awning with the housing removed and certain wiring routes shown in phantom.

FIG. 1D is an enlarged front elevation view of the motor head assembly 108 with the front housing cover removed. Within the motor head assembly 108 is a motor 126 and a gearbox 128 connected to the output shaft of the motor 126. The roller 106 is connected to the transmission output of the gear box 128. The control module is mounted within the motor head assembly 108, for example, to the back of the housing or any other fixed surface, with any appropriate fastener (e.g., adhesive, screws, bolts, etc). The lead wire assembly 118 connected to the control module 116 may be separated into two bundles, a control lead bundle 118a and a power lead bundle 118b. These two lead bundles may extend along the stationary arm 110 to connect with the actuation switch 120 and the power supply on and in the RV. In a retrofit implementation, the control lead bundle 118a and the power lead bundle 118b may already be mounted to along the stationary arm 110 and the control module 116 may simple be mounted to the ends of the leads with standard connectors.

First and second motor control wires 132a, 132b may extend from the control module 116 and connect with respective power terminals 130a, 130b mounted within the motor head assembly 108. First and second motor lead wires 134a, 134b connected with the motor 126 may extend therefrom and also connect with the power terminals 130a 130b, respectively, thus completing a connection between the control module 116 and the motor 126.

Figure 2:
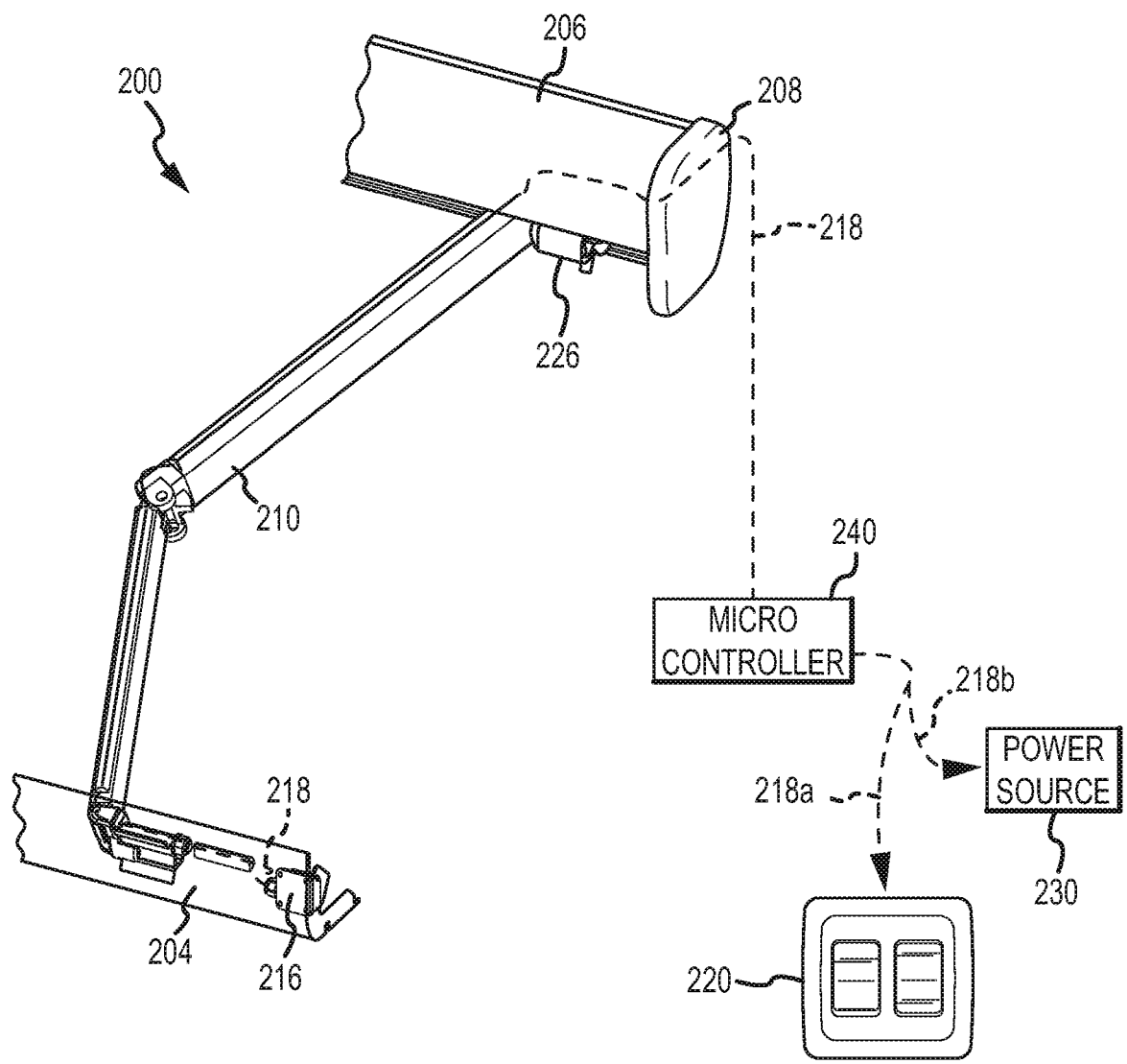
FIG. 2 is an isometric view of an alternate implementation of a motorized retractable awning with additional control components presented schematically.

FIG. 2 is a schematic diagram of an alternate implementation of a retractable awning 200 equipped with a multidimensional motion detector module 216 affixed to the lead rail 204 of the awning 200. The awning canopy is not shown in this figure. A pair of articulated extension arms 210 connect to the lateral ends of the lead rail 204 to extend the awning 200 from the side of the RV. In the implementation of FIG. 2, the roller and the motor 226 of the awning 200 are mounted on the sidewall of the RV and covered by a housing 206 and an end cap 208. Since the motor 226 is mounted to the RV, there is no wiring running along the extension arm 210 to the lead rail 204. The microcontroller 240 is thus usually mounted on the RV and is connected to the power source 230 and the actuation switch 220.

In this embodiment, a lead wire assembly 218 extends from the control module 240, along one of the extension arms 210, and to the multi-dimensional motion detector 216 in the lead rail 204. The lead wire assembly 218 may include four wires: three to receive the dimensional output from the multi-dimensional motion detector 216 and a fourth to provide power to the device 216. A pair of power leads may also extend from the control module 240 to the motor 226 in order to provide power to the motor. The lead wire assembly 218 connected to the control module 240 may be separated into two bundles, A control lead bundle 218a may extend from the control module 240 to connect with the actuation switch 220 and a power lead bundle 218b may extend from the control module 240 to connect with the power supply 230 and ground.

Figure 3:
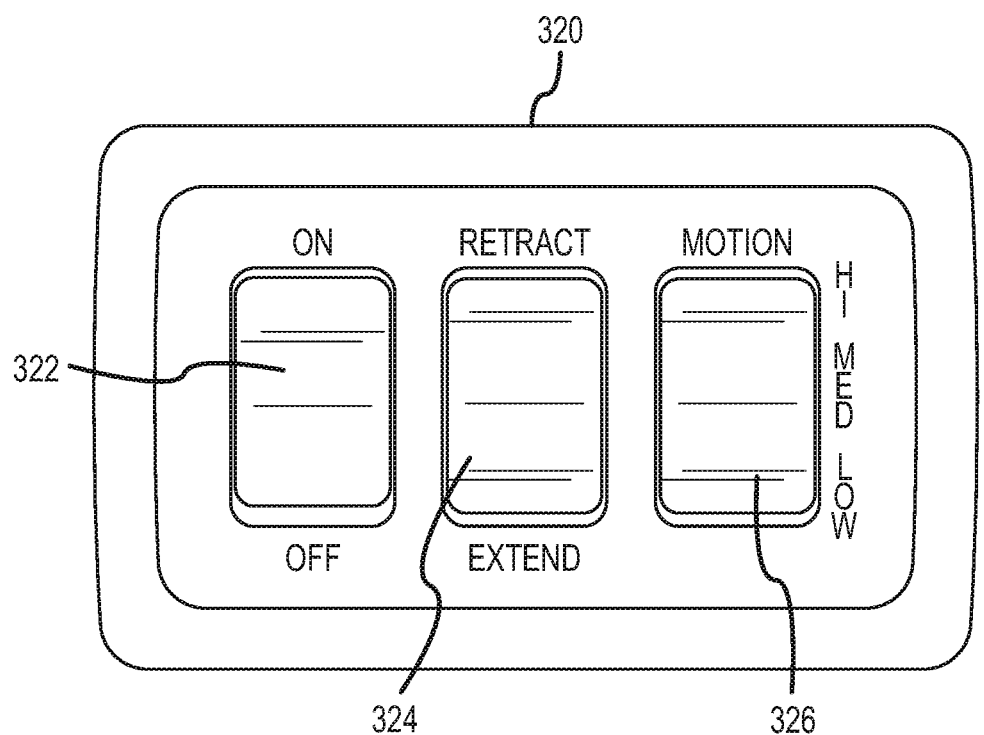
FIG. 3 is a front elevation view of an alternate implementation of a control switch for a retractable awning.

FIG. 3 depicts an alternative implementation of an actuation switch 320. In this embodiment, the actuation switch 320 has three manual control options for the awning. The first switch is a SPST system power switch 322 for turning power to the awning on and off. The second switch is a SPDT momentary rocker switch 324 for extension or retraction the awning. The third switch is a single pole, triple throw (SPTT) (or center off), stationary rocker tolerance switch 326 that provides user control tolerance settings for the auto-retraction functions as further described below. In this embodiment, the normal setting may be considered medium tolerance, which is the center off position of the tolerance switch 326. If a user wants to decrease the tolerance of the auto-retraction system to initiate retraction of the awning at lower wind speeds, the user may press the tolerance switch 326 to the low position. Alternatively, if a user wants to increase the tolerance of the auto-retraction system to initiate retraction of the awning at higher wind speeds, the user may press the tolerance switch 326 to the high position. The common for the tolerance switch 326 may be sourced from the same common power lead used for the extension/retraction switch 324. At least two additional wires from the tolerance switch 326 to the microcontroller in the control assembly would be required. Signals from the tolerance switch 326 would constitute an instruction for the microcontroller to either add or subtract a value from the standard threshold values used to determine whether to actuate the auto-retraction feature as further described below.

Figure 4:
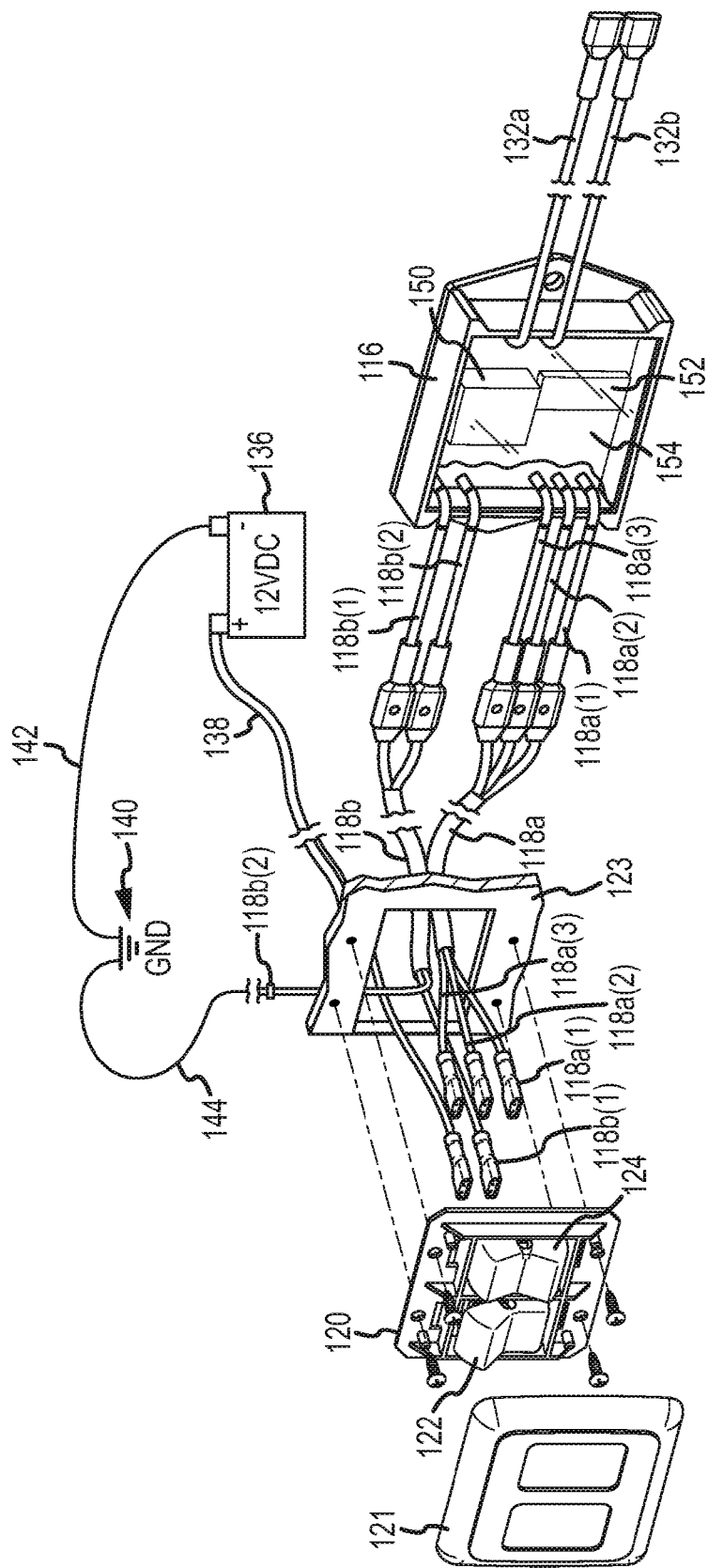
FIG. 4 is a isometric representation diagramming wiring leads and switch connections for a potted electrical control assembly for the retractable awning of FIG. 1A.

FIG. 4 is a schematic diagram of component wiring for a potted electrical control module 116 for the retractable awning of FIG. 1A. The control system module 116 is shown connected with a 12V power supply 136, a power switch 122 (with a faceplate 121 removed), a manual extension/retraction switch 124, and with motor control wires 132a, 132b extending to an awning motor (not shown). Among the components on the circuit board 154 of the control system module 116 are a microcontroller 150 and a multi-dimensional motion detector (accelerometer) chip 152. The circuit board 154, the chips 150, 152 mounted thereon, and all the lead connections are potted in a waterproof, shock resistant epoxy resin, polyurethane, silicone, or other appropriate material in order to protect the control module 116 from weather, travel vibration, and extreme motion (e.g., due to wind gusts).

In addition to the motor control wires 132a, 132b, the first, second, and third control wires 118a(1, 2, 3) and the first and second power supply wires 118b(1, 2) also extend from the control module 116 for connection with the power supply 136 and actutation switches 120. The control wires 118a(1, 2, 3) and the power supply wires 118b(1, 2) may be provided on the control module 116 as short tails with connectors that are configured to connect with corresponding connectors on a control lead bundle 118a and a power lead bundle 118b in order to enhance the ease of installation and replacement of the control module 116 if necessary. The control lead bundle 118a and the power lead bundle 118b travel from the motor head assembly 108 on the leading edge of the awning 100 along the extension arm 110, and to the box of actuation switches 120 mounted to a surface 123 of the RV where the individual wires may again be connected with shorter tails extending from the actuation switches 120 and the power supply.

As shown in the implementation of FIG. 4, the first control wire 118a(1) is connected to the extend lead on the extend retract switch 124 (see FIG. 10). The second control wire 118a(2) functions as the common lead on the extend retract switch 124. The third control wire 118a(3) is connected to the retract lead on the extend retract switch 124. The first power supply wire 118b(1) is attached to a first terminal of the system power switch 122 and the second power supply wire 118b(2) is connected to a ground lead 144 that is connected to ground 140. A power supply lead 138 is connected between a second terminal of the power supply switch 122 and the positive terminal of the power supply 136 (e.g., a 12V battery in the RV). The negative terminal of the power supply 136 is also connected to ground 140 via a ground wire 142.

Figure 5A:
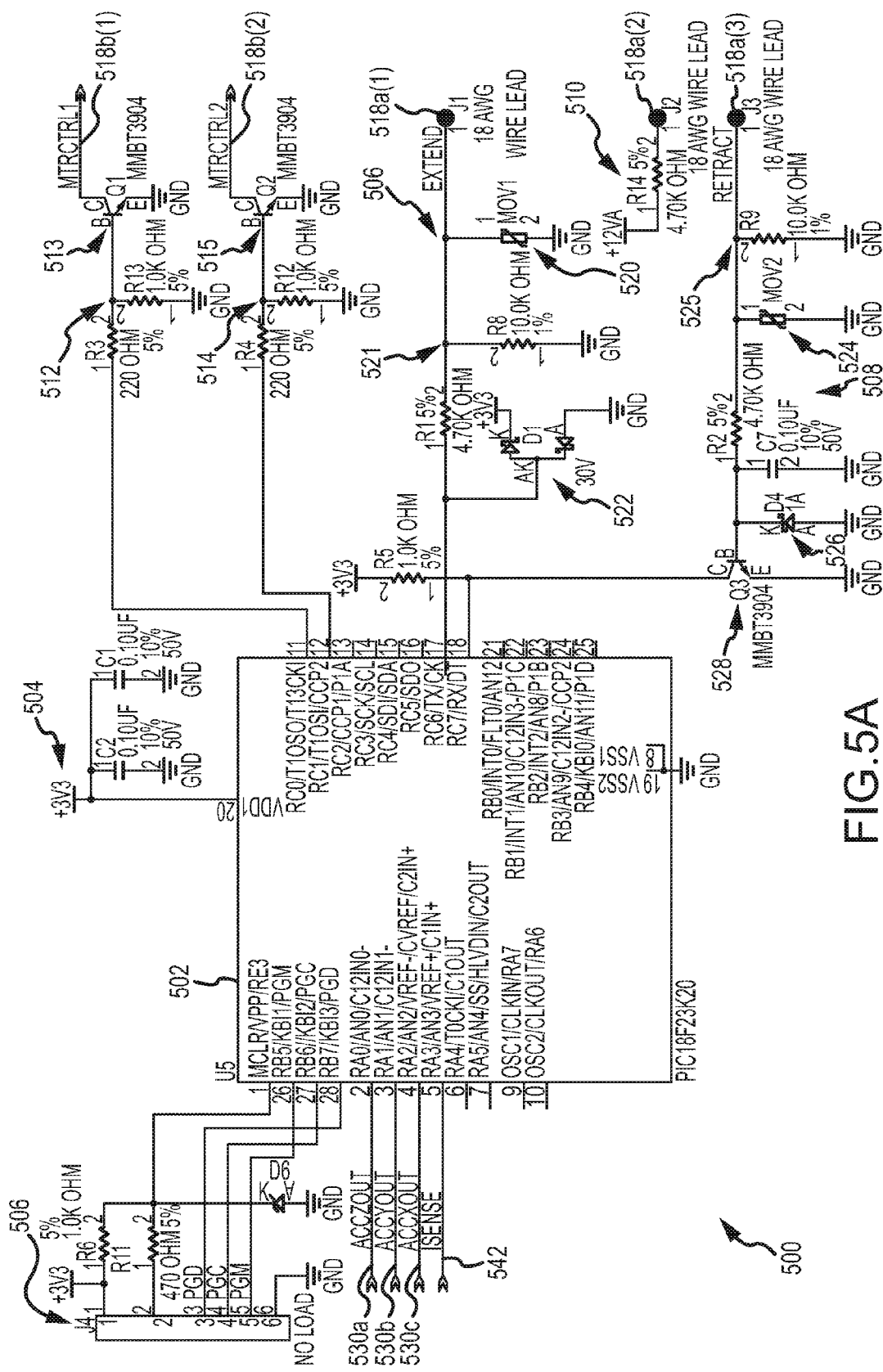
FIG. 5A is a schematic diagram of a first portion of an implementation of a control circuit for controlling the retractable awning of FIG. 1A.

FIG. 5A is a schematic diagram of a first portion of an implementation of a control circuit 500 for controlling the retractable awning of FIG. 1A. The circuit in FIG. 5A includes a microprocessor in the form of a microcontroller 502. In an exemplary implementation, the microcontroller may be a programmable interface controller, e.g., a PIC18F23K20 chip. The microcontroller 502 has a voltage input 504 and receives three motion inputs 530a, 530b, 530c corresponding to each of the three-dimensional (Z, Y, X) motion readings generated by the accelerometer 516 (see FIG. 5B) as well as a current input signal 542 from a current monitor 540 (see FIG. 5C) within the circuit 500. The microcontroller 502 outputs motor control signals 518b(1), 518b(2) for controlling the motor based upon the input signals. The output signals 518b(1), 518b(2) may each be conditioned by a voltage divider 512, 514 and a junction transistor 513, 515 to isolate the microcontroller from the higher line voltage used to actuate the relay 536 and motors (see FIG. 5C). A serial peripheral interface bus 506 may be connected to the microcontroller 502 for initial installation of firmware on the microcontroller before the circuit 500 is potted within the control assembly.

In this implementation, the microcontroller 502 received two additional control inputs from the actuator switch corresponding to the extend lead 518a(1) and the retract lead 518a(3). The 12V DC power supply 510 from a battery source (e.g., the RV battery) is additionally shown in FIG. 5A and is supplied to the common lead 518a(2) that provides a voltage source for each of the extend lead 518a(1) and the retract lead 518a(3). The signals from each of the extend and retract leads 518a(1), 518a(3) are conditioned before reaching the microcontroller 502, in part in order to allow for ping commands to place the microcontroller in an update or data transfer mode (as further explained below) as well as to provide for data transfer over the extend and retract leads 518a(1), 518a(3).

The portion 506 of the circuit 500 connecting the extend lead 518a(1) to the microcontroller 502 is bidirectional allowing for data transfer from the microcontroller in addition to signal inputs. This extend lead portion 506 may have a metal-oxide varistor or other transient voltage suppressor 520, a voltage divider 521, and a diode clamp 522 for line conditioning. The retract lead portion 508 may similarly have a transient voltage suppressor 524, a voltage divider 525, and a diode clamp 526 for line conditioning as well as other components. In particular, the retract lead portion 508 may additionally have a bipolar junction transistor 528, rendering the retract lead portion 508 unidirectional allowing only signal transmission to the microcontroller 502, but not data transfer from the microcontroller 502.

Figure 5B:
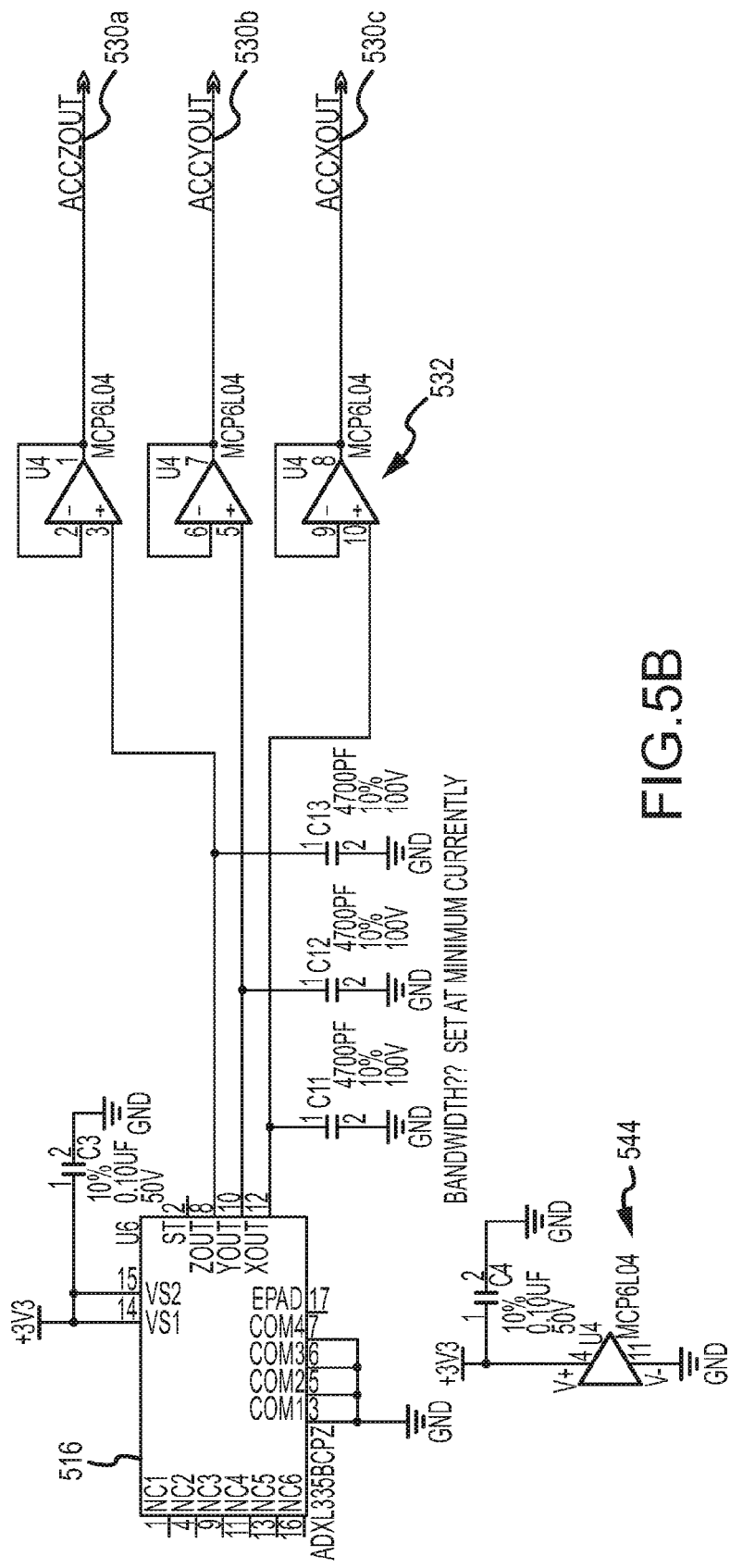
FIG. 5B is a schematic diagram of a second portion of an implementation of a control circuit for controlling the retractable awning of FIG. 1A.

FIG. 5B is a schematic diagram of a second portion of an implementation of the control circuit 500 for controlling the retractable awning of FIG. 1A. The circuit in FIG. 5B includes the MEMS-based motion detector or accelerometer 516 and shows three output lines 530a, 530b, 530c corresponding to three-dimensional motion data. In one implementation, the accelerometer 516 may be an ADXL335BCPZ chip. Each of the output lines 530a, 530b, 530c from the accelerometer 516 may be conditioned with various components, including, for example, an operational amplifier functioning as a voltage follower buffer 532 in order to ensure clean output signals from the accelerometer 516.

Figure 5C:
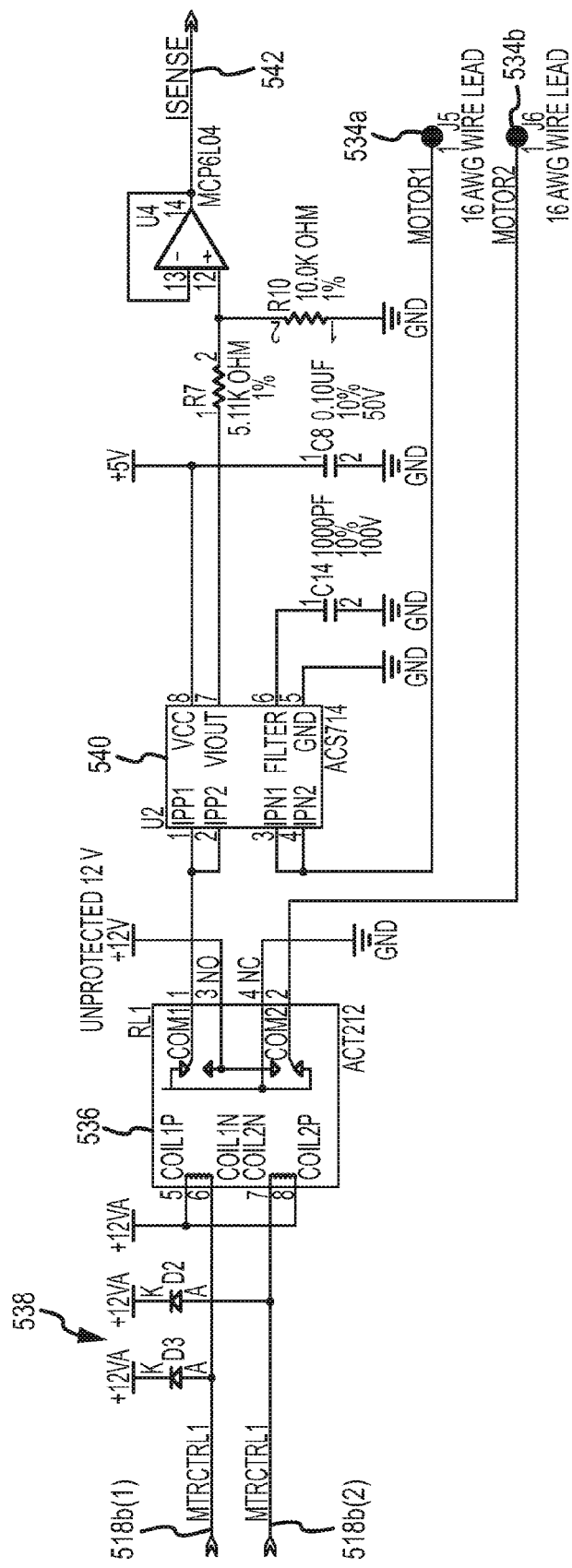
FIG. 5C is a schematic diagram of a third portion of an implementation of a control circuit for controlling the retractable awning of FIG. 1A.

FIG. 5C is a schematic diagram of a third portion of an implementation of the control circuit 500 for controlling the retractable awning of FIG. 1A. The circuit portion of FIG. 5C includes a relay 536 for operating the motor and a current sensor 540 that monitors motor current draw. The relay 536 receives the motor control signals 518b(1), 518b(2) from the microcontroller 502 as increased from line level signals by additional power from the power supply to direct operation of the motor in either a forward/extend direction or a reverse/retract direction. Flyback diodes 538 may be used between the induction coils of the relay and the power supply to protect the power supply from voltage spikes. The outputs of the relay 536 connect to two motor leads 534a, 534b to actuate the motor in either a forward or reverse direction. A current monitor chip 540 may be placed in series with one of the motor leads 534a, 534b from the relay 536 to the motor. The current sense chip 540 monitors the level of current drawn by the motor to identify conditions such as motor stall or no draw indicating malfunction. Output from the current monitor chip 540 is used as an input in the microcontroller 502 in the determination of various motor control functions as further described below.

Figure 5D:
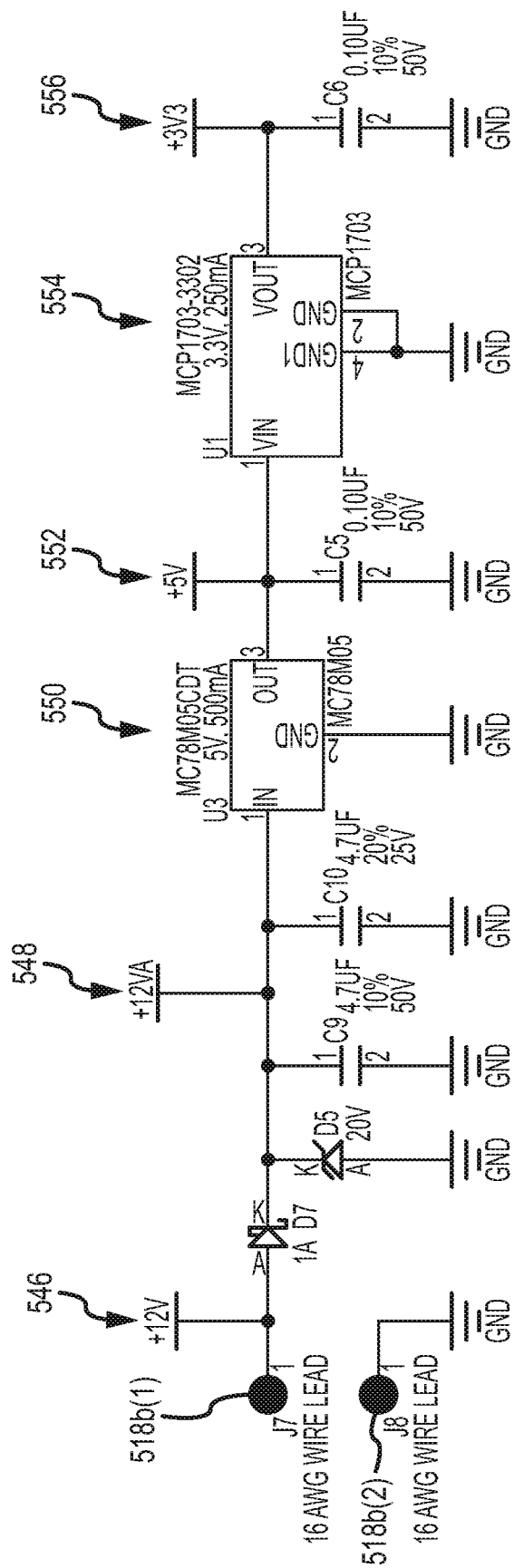
FIG. 5D is a schematic diagram of a fourth portion of an implementation of a control circuit for controlling the retractable awning of FIG. 1A.

FIG. 5D is a schematic diagram of a fourth portion of an implementation of a control circuit for controlling the retractable awning of FIG. 1A. The circuit portion in FIG. 5D details a set of voltage regulators that provide constant and appropriate voltage levels to the circuit. As previously shown in FIG. 4, the first power lead 518b(1) is connected to a 12V bus line 548 conditioned from the 12V power supply 546 (e.g., an RV battery) while the second power lead 518b(2) connected to ground. A first positive voltage regulator chip 550 transforms power from the 12V bus line 548 and outputs to a 5V bus line 552 for providing required power to the current sense chip 540. A second positive voltage regulator chip 554 steps the voltage down from the 5V output of the first positive voltage regulator chip 550 and outputs to a 3.3V bus line 556 for providing required power to the microcontroller 502, the accelerometer 516, and other components. The circuit portion in FIG. 5D further depicts a conditioning circuit 544 for the 3.3V bus line.

Figure 6:
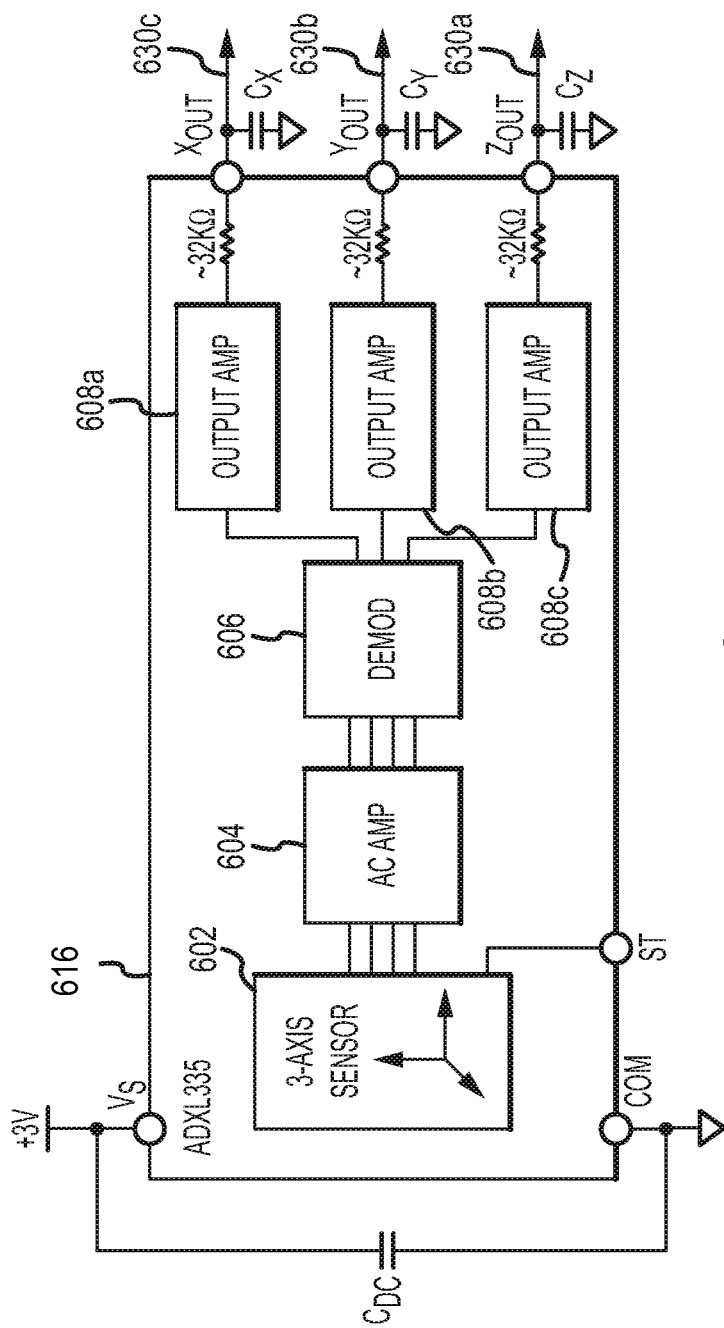
FIG. 6 is a schematic diagram of a multidimensional motion detector as used in the control circuit of FIG. 4.

FIG. 6 is a schematic diagram of a multidimensional motion detector or accelerometer 616 as used in the control circuit of FIG. 5B. In one implementation, the multidimensional motion detector 616 may be a complete three-axis acceleration measurement system (e.g., an ADXL335 chip). The detector chip may have a measurement range of ±3 g minimum. In one embodiment, the detector chip contains a polysilicon surface, micro-machined sensor 602 and signal conditioning circuitry to implement an open-loop acceleration measurement architecture. The output 630a, 630b, 630c of the MEMS accelerometer 616 may be analog voltages that are proportional to the measured acceleration. The multidimensional motion detector 616 thus acts as an accelerometer that can measure the static acceleration of gravity in tilt-sensing applications as well as dynamic acceleration resulting from motion, shock, or vibration. In other implementations, a digital output MEMS device may be used that provides data output representative of acceleration in each of three dimensions.

The sensor may be a polysilicon surface, micro-machined structure built on top of a silicon wafer. Polysilicon springs suspend the structure over the surface of the wafer and provide a resistance against acceleration forces. Deflection of the structure is measured using a differential capacitor that consists of independent fixed plates and plates attached to the moving mass. The fixed plates are driven by 180° out-of-phase square waves. Acceleration deflects the moving mass and unbalances the differential capacitor resulting in a sensor output whose amplitude is proportional to acceleration. The sensor output is amplified by an AC amplifier 604. Phase-sensitive demodulation techniques in a demodulator 606 may then be used to determine the magnitude and direction of the acceleration. The demodulator output may be amplified using individual output amplifiers 608a, 608b, 608c for each axis and brought off-chip through a resistor. The user may then set the signal bandwidth of the device by adding a capacitor. This filtering improves measurement resolution and helps prevent aliasing. Because the detector uses a single structure for sensing the X-, Y-, and Z-axes, the sense directions of the three axes are highly orthogonal and have little cross-axis sensitivity.

Figure 7:
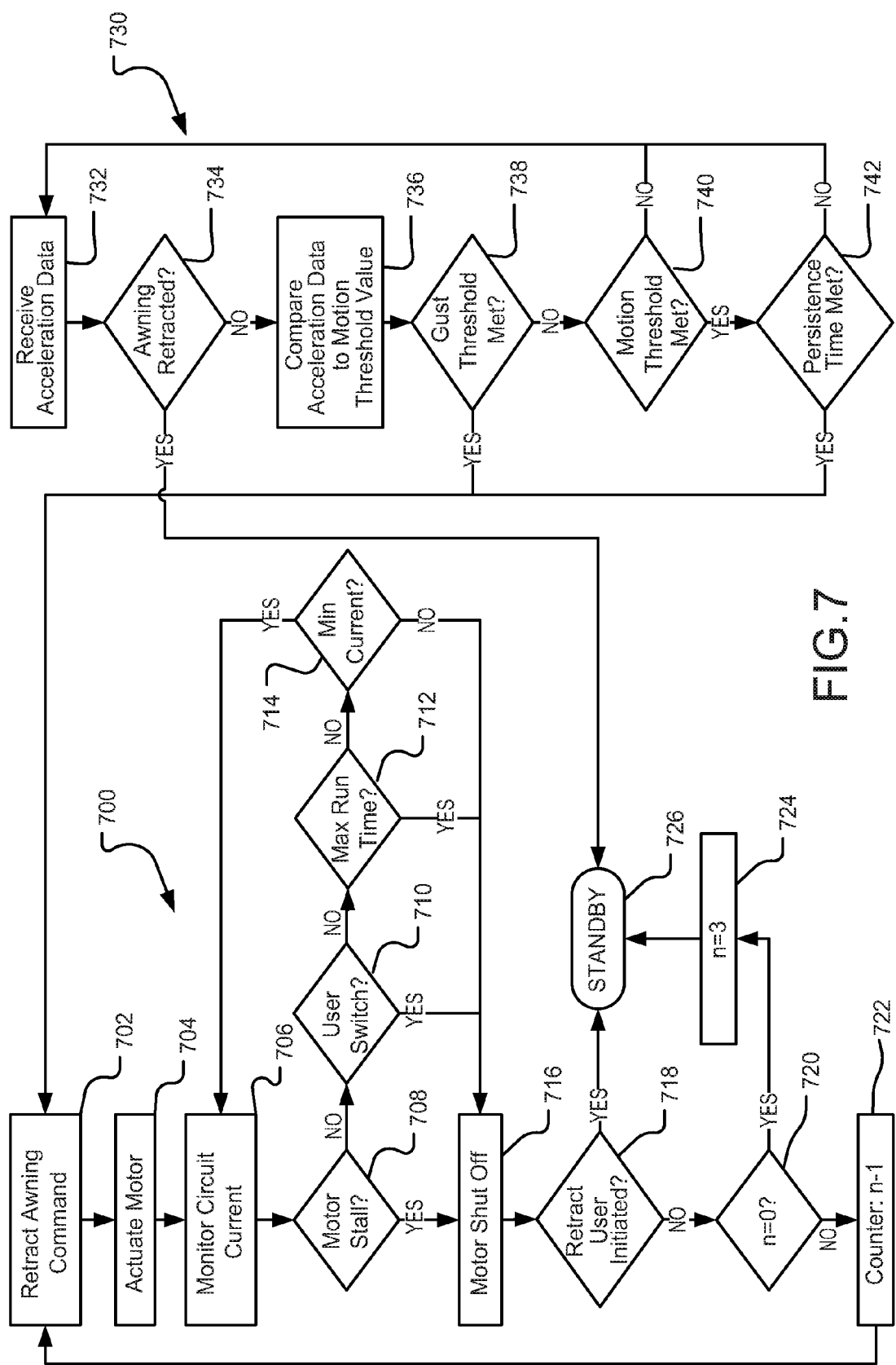
FIG. 7 is a flow diagram of an exemplary control process for retraction of an awning.

Both automatic and manual retraction of a motorized awning may be controlled by a microcontroller receiving both accelerometer data and manual input as described above. Firmware in the microcontroller may be used to implement such processes. FIG. 7 is a flow diagram of exemplary process steps 700 that may be embodied in firmware on the microcontroller for controlling the retraction process 700. As shown in FIG. 7, upon receipt of an awning retract command as indicated in operation 702—either a manual input signal by a user selecting a switch or an automatic input signal based upon motion information from the accelerometer device—the controller actuates the motor in a retraction direction as indicated in operation 704.

During motor operation, circuit current may be constantly monitored against various threshold values as indicated in operation 706 that indicate a need for an awning retraction auto-shutoff function. Such an auto-shutoff of the retraction function may be provided to disconnect the power to the motor during a retraction to prevent damage to the motor or other awning components. In a first instance, the circuit current may be monitored to detect the likelihood of a motor stall as indicated in decision operation 708. A motor stall is indicated by a large current draw which reflects a strong resistance to further retraction of the awning. Such a resistance may be caused by a number of factors including, for example, a locked rotor condition indicating full retraction of the awning, a physical impediment to awning retraction (e.g., a tree branch or camping equipment), a wind gust, or a spring force in the awning that holds the awning in a fixed position.

In an exemplary embodiment, the firmware may be programmed with a number of threshold values in order to detect a stall.

A Minimum Current Value (MCV) may be set as the minimum retraction current tracked and averaged over a short time to filter noise and act as floating baseline value to which a motor-specific value is added (see the OCT value described below) for an upper threshold value indicative of a stall. Since the MCV is an average value, the awning position may not be retained during a power cycle. As such, if a retract event occurs immediately following power up, there is no stored MCV to reference in conjunction with the motor-specific value and, as such, will allow the awning motor to draw full stall current until a timer expires (see the MRT value described below). This may cause overheating and trip the motor's thermal fuse. In order to prevent this from occurring, several options may be configured.

In a first option, a brief, timed, auto-extension may occur upon power-up, just long enough to allow the MCV to be set, followed by an auto-retraction. In a second option, a default MCV value may be loaded during power cycle start-up. This default value could be the last calculated MCV from a prior usage or it may be a set value. This method is simpler, but does not auto-calibrate the auto-shutoff routine to allow for variances in motors and power supply levels. This option also risks not properly detecting stall under all conditions, but the risk can be mitigated or possibly eliminated via set of a minimal MCV values specific to various motor types.

In one implementation, a floor value (e.g., 3 A) for the MCV may be also used to prevent nuisance stall in the case of a billow event during initial awning retraction. The initial value would then be updated over time based upon average measured values. For example, the retraction current is highest during initial phase of gas shock compression (e.g., in the 7-8 A range at 13.6V) but quickly decreases as gas shocks are compressed. A billow event during initial retraction reduces current to within the 1-2 A range since the wind lifts the canopy and further compresses the gas shocks, thus drastically reducing the motor load. Once the canopy relaxes and the gas shocks are extended, the motor load is returned to normal, the current increases, and a stall is detected. Utilizing a MCV or floor value of 3 A, along with a higher shutoff value, e.g., of 4 A (explained below), aids in preventing nuisance stall under these conditions.

An Over Current Threshold (OCT) may be set for use in calculating the current value threshold for auto-shutoff. The OCT may ride above the floating MCV baseline value. For example, in one implementation, the OCT may be set at 2-4 A above the presently stored MCV value. Using a 4 A OCT above a minimum 3 A MCV results in a minimum 7 A stall detection value. Testing in various models of motors from different manufacturers and in different awnings with differing spring or gas shock loads identifies ranges of 11 A to 19 A stall current from 9.5 to 14.5 VDC. Therefore, the value set for the OCT will depend upon the type of motor and tension used in the particular awning application. Further, an Over Current Persistence (OCP) may be set as the duration the measured current must remain above the OCT to trigger auto-shutoff. For example, in one implementation, the OCP may be set at 500 ms. In some implementations, motor startup inrush is ignored and current is ignored as long as retract button is pushed. A stall is thus detected when the measured current exceeds the Over Current Threshold, which rides above the Minimum Current Value, for the duration of the Over Current Persistence time. The microcontroller can thus direct motor shutoff as indicated in operation 716 when these conditions are met.

The firmware controlling the retraction process 700 may also monitor for additional user input, i.e., the user pressing the extend/retract switch, as indicated in decision operation 710. For example, the user may interrupt an auto-retraction event by pressing either the extend button or the retract button, which will serve to stop the awning retraction as indicated in the flow from decision operation 710 to the motor shutoff operation 716. However, such user action does not disable auto-retract from re-occurring as long as the awning is extended (as further described below). In another embodiment, the awning control system may feature maintaining power to the motor as long as the extend button is pressed. In a further embodiment, power to the motor may be maintained until auto-shutoff occurs for a momentary press of either the retract button, the extend button, or both.

The firmware controlling the retraction process 700 may also monitor a Max Run Time (MRT) value as indicated in decision operation 712. The MRT is the maximum retraction event operation time to provide failsafe stall shutoff in the event no OCT is detected. In other words, there is generally a period of time that it takes for a particular awning to retract. If for some reason, the microcontroller does not detect a high current load due to a motor stall upon full retraction, the MRT acts as a failsafe to stop the motor after an adequate period of time so that the motor does not continue to operate indefinitely and either damage the awning mechanism or burn out. For example, in one implementation, the MRT may be set at 80 s. If a stall is not detected within the Max Run Time, the motor is shut off as indicated in the flow from decision operation 712 to the motor shutoff operation 716.

The firmware controlling the retraction process 700 may also monitor a Minimum Current Threshold (MCT) as indicated in decision operation 714, which may be set as the minimum measured current value required during a retraction event to allow auto-retraction to continue. The MCT allows for quick auto-shutoff in the event no load is connected or the motor is disabled. For example, in one implementation, the MCT may be set at 400 mA+/−100 mA. If the MCT is not exceeded continuously during retraction, the motor is shut off. A Minimum Current Persistence (MCP) may be set as the duration that the measured current must remain below the MCT to trigger auto-shutoff. For example, in one implementation, the MCP may be set at 500 ms.

If any of the above conditions, i.e., a motor stall, a user input, or the maximum retraction time, are not met and there is a minimum current draw indicating motor operation, the process 700 continues to monitor current activity on the circuit as to identify such conditions as indicated by the loop through operation 708. If any of these conditions, i.e., a motor stall, a user input, or the maximum retraction time, do occur, the controller switches of the motor as indicated in operation 716 by sending an appropriate signal to the switch relay.

However, the process 700 makes a further determination before merely returning to a standby state awaiting a new user command to retract or extend the awning or an auto-retraction signal. In this implementation, a determination is made as to whether the halted retraction operation was user initiated as indicated in decision operation 718. If the retraction command was user initiated, the retraction process 700 terminates to enter a standby mode as indicated in operation 726 and await further signal input. Alternatively, if the retraction process 700 was auto-initiated, e.g., due to a signal from the gale/gust process 730 (further described below), the retraction process 700 will restart the motor up to 3 times consecutively to ensure awning closure in the case of wind.

As indicated in FIG. 7, a counter may be used in the process 700 to ensure awning closure in the event of an auto-retraction command. This is a failsafe in case, for example, a wind gust during retraction was so strong that it caused a motor stall before full retraction of the awning. If the counter does not equal 0 as determined in decision operation 720, then the counter is decremented by 1 as indicated in operation 722 and the retraction process resumes at operation 702. If the counter does equal 0 as determined by the decision operation 720, the counter is reset to 3 as indicated in operation 724 and the process 700 terminates in a standby mode at operation 726 until a new manual or automatic retraction signal is received.

As noted above, the retraction process 700 of FIG. 7 can be either manually initiated by a user, or automatically initiated by a motion event, e.g., wind, affecting the awning. If the motion event exceeds certain thresholds values as described below with respect to the gale/gust portion 730 of the retraction process 700, then the retract awning operation 702 is initiated.

For auto-retraction of an awning due to a motion event (e.g., wind), output signals from the multidimensional motion detector on the leading edge of the awning are monitored by the microcontroller, for example, a peripheral interface controller, to determine the acceleration of the leading edge of an awning. The output signals serve as input signals to the microcontroller as indicated in operation 732 for determining whether the awning should be retracted. When acceleration data is received as the microcontroller in operation 732, the gale/gust process 730 first determines whether the awning is extended or retracted as indicated in decision operation 734. If the awning is already fully retracted, e.g., as determined by a Boolean value stored in the microcontroller upon full retraction, the control system remains in standby mode as indicated by the flow to operation 726 and the process 700 continues to monitor for retraction commands.

Similarly, the gale/gust process 730 continues to monitor the acceleration data received from the multi-axis motion sensor device. In the alternate situation in which the awning is extended as determined in decision operation 734, the microcontroller compares the acceleration data to a pre-set threshold values reflective of sustained winds and significant gusts, respectively, as indicated in operation 736. The firmware controlling the gale/gust process 730 may monitor a Gust Detect Threshold (GDT) value as indicated in decision operation 738. The GDT is an acceleration value threshold that, when exceeded by the acceleration data received from the multi-axis motion sensor device, generates instantaneous trigger of an auto-retract event as indicated by the flow from decision operation 738 to the retraction operation 702. This value may be set within the microcontroller by the manufacturer. Wind gust detection may also use a Gust Detection Persistence (GDP) time as a duration of measured acceleration required before triggering an auto-retract event, but it is generally only long enough to filter noise. For example, in one implementation, the MPT may be set at 100 milliseconds.

If the gust threshold is not met, the gale/gust process 730 next determines whether a sustained gale force of the wind is significant enough to warrant auto-retraction of the awning as indicated by the flow from decision operation 738 to decision operation 740. The firmware controlling the gale/gust process 730 may compare a Motion Threshold Value (MTV) to the acceleration data as indicated by decision operation 740. The MTV is an acceleration value threshold for trigger of auto-retract event based upon sustained wind forces. This value may be set within the processor by the manufacturer. If the acceleration data does not meet or exceed the MTV value in magnitude, the gale/gust process 730 returns to operation 732 to continue monitoring the acceleration data.

However, if the magnitude of the acceleration forces does exceed the MTV threshold, the process 730 further determined whether the gale force is sustained long enough to warrant awning retraction. This is determined by comparing a Motion Persistence Time (MPT) to the sustained time of a gale force. The MPT is the duration that the measured acceleration must continuously remain above the MTV in order to trigger an auto-retract event. For example, in one implementation, the MPT may be set at 2 seconds. Note that wind gust detection is enabled via a much higher pre-set GDT, which essentially serves as an override of the MPT to generate an instantaneous auto-retract trigger. Once the awning is retracted, acceleration values may be ignored as previously discussed with respect to decision operation 734.

In an alternate implementation, two averages (long and short) of filtered and weighted XYZ acceleration data from the accelerometer may be used for comparison against the GDT and MTV. The short average is for gust detection and the long average is use to detect sustained gale wind movement. In one implementation, the short average may be taken over approximately 100 ms and the long average may be taken over approximately 4 sec. As soon as either of these averages exceed their respective thresholds, an auto-retract event is initiated; there is no need to use the Motion Persistence Time or Gust Detection Persistence time in this implementation.

In one exemplary implementation, the Z-axis output of the accelerometer represents sideways awning movement, which is least likely to occur in windy conditions. Four sample differential averages are taken and then weighted by Z_Gain=4. The X-axis of the accelerometer is generally aligned with awning extension and retraction movement. Four sample differential averages are taken and then the values are weighted by X_Gain=2. The Y-axis of the accelerometer is generally aligned with vertical awning movement (e.g., bouncing up and down due to wind). Four sample differential averages are taken and then the values are weighted by X_Gain=1.

The modified XYZ data is then summed. The average of this sum is then calculated by dividing by 4 for the 4 samples taken above (avg_of_sums). A "short_sum" is then calculated as follows:

(previous sample of short_sum)*(900/1000)+current value of avg_of_sums.

This calculation arises from the use of integer math (as opposed to using floating point). The output value of short_avg is =short_sum/10. This equates to a 10 sample "Short Average," which is used to compare directly with the gust threshold to trigger an auto-retract event. The "Long Average" value is calculated much the same way, but uses a long_sum defined as follows:

(previous sample of long_sum)*(975/1000)+current value of avg_of_sums,

Then long_avg=long_sum/40. This equates to a 40 sample "Long Average" which is used to compare directly with the motion threshold value to trigger an auto-retract event.

As discussed above with respect to FIG. 3, in an alternative implementation, a manual user input may be received from a tolerance switch to raise and lower the tolerance of the auto-retraction function of the microcontroller. If the system is equipped with such an additional switch, the threshold values against which the weighted and averaged accelerometer data are measured may be either increased or decreased by respective set values corresponding to high an low tolerance inputs indicated by a user through the tolerance switch, where the medium position of the tolerance switch corresponds to the standard threshold values programmed into the microcontroller.

Figure 8:
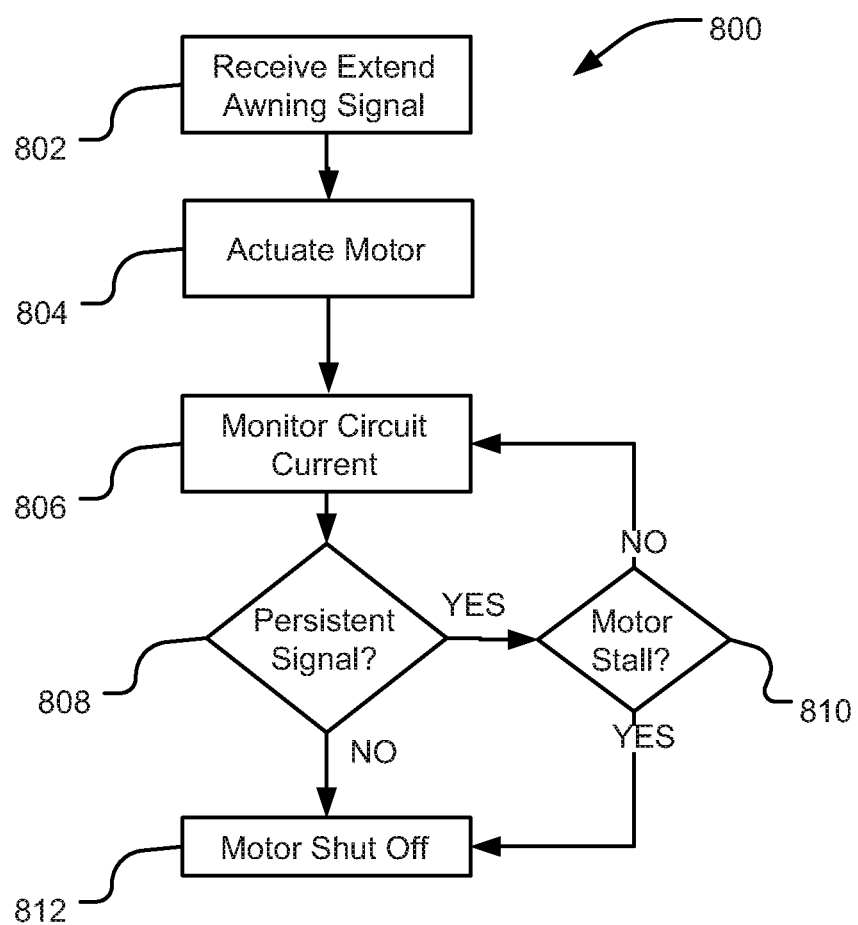
FIG. 8 is a flow diagram of an exemplary control process for extension of an awning.

FIG. 8 presents a flow diagram of an exemplary awning extend process 800 controlled by the firmware in the microcontroller. Initially, an awning extend signal is received by actuation of a manual extend actuation switch activated by a user as indicated in operation 802. At this time, the motor is actuated by an extend signal from the microcontroller as indicated in operation 804. During motor operation for the awning extension, the circuit current is monitored, as indicated in operation 806, similar in manner to the current monitoring operation in the retraction process. In one exemplary implementation of the awning extension process, the current is monitored for a persistent extension signal from the extend switch as indicated in decision operation 808. Thus, in this implementation, the user must constantly press the extend actuator until the awning is completely extended or has extended a desired distance short of full extension. In this way, a user can control how far to extend the awning. In other implementations, the extend actuation could be programmed to automatically fully extend upon a single, non-persistent actuation signal and stop at an intermediate location if the switch is selected again during the extension process.

Returning to the embodiment depicted in FIG. 8, if the extension signal is interrupted or disappears, then the microcontroller switches the motor off to stop further extension of the awning as indicated in operation 812. Alternatively, if the extension signal remains persistent, then the extension process 800 monitors for a high current, motor stall condition indicative of full extension of the awning (or possibly an obstruction) as indicated in decision operation 810. If no motor stall condition is identified, the circuit current continues to be monitored as indicated by the flow back to operation 806 until a signal condition directing alternate action is identified. If instead there is indeed a motor stall, the motor is shut off as indicated by the flow to operation 812 in order to prevent damage to the motor or other awning components. In an alternate embodiment, the microcontroller may ignore any circuit conditions as long as the manual extension switch is depressed by the user.

Figure 9:
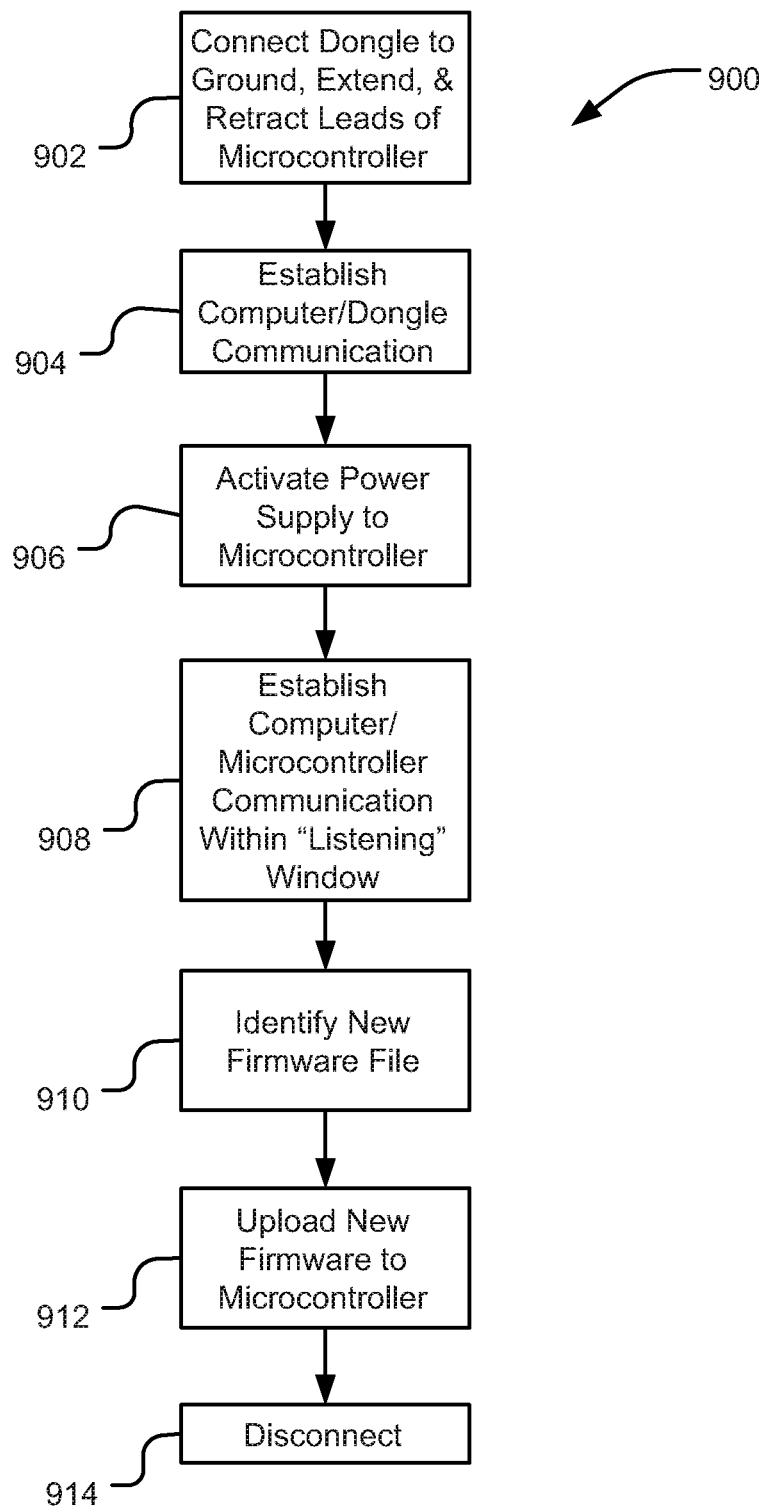
FIG. 9 is a flow diagram of an exemplary control process for updating the firmware in a potted microcontroller of an awning control system.

FIG. 9 presents a flow diagram of a firmware update process 900 that may be performed to update the firmware on the potted circuit even after installation within an awning system. As apparent from the control assembly configuration in FIG. 4 and the circuit diagram in FIG. 5A, the Serial Peripheral Interface (SPI) on the board is no longer accessible after the board is potted in the control assembly. Therefore, updates to the firmware on the microcontroller are impossible to make through either the SPI or the standard SPI inputs on the microcontroller. In order to overcome this dilemma, the circuit may be designed to allow for data transfer communications using the lead wires from the extend/retract switch as in the embodiments presented herein.

Initially, a connection is established between the control leads and an interface bus on a computer as indicated in operation 902. In one implementation, this connection may be established by a dongle using, for example, a Future Technology Devices International Ltd. FT232R USB to serial UART IC (www.ftdichip.com) with wire leads for connection to the battery ground, and to the extend and retract leads connected to and extending from the control assembly. The extend and retract wire leads may be disconnected from the control switch for this purpose. The USB end of dongle may then be connected to the computer.

The computer may be equipped with a specific software program for establishing communication with the microcontroller through the wire leads. Initially, the software establishes a connection with the USB to serial UART chip as indicated in operation 904. This may be automatically or manually initiated. Next the power supply to the microcontroller is actuated as indicated in operation 906. This may be accomplished by actuating the On/Off switch for the awning system or alternately by connecting the power supply leads from the control assembly to a separate switched power source (e.g., 12V DC) used for the purposes of the update operation.

The firmware within the microcontroller may be designed to include a "listening window" upon initial power-up on the pins for the extend and retract leads in order to recognize attempts for firmware updates or data downloads as indicated in operation 908. Within a short period after actuation of the power supply, e.g., within 1 to 2 seconds, a "ping" command may be automatically or manually initiated by the computer to indicate to the microcontroller that a communications link is requested. This establishes communication with the microcontroller and prevents the microcontroller from undertaking its normal control operations. If a ping signal is not sent, the microcontroller will proceed to monitor wind conditions and operate the extend and retract functions either automatically or upon receipt of manually actuated signals.

Once communication between the microcontroller and the computer has been established, the computer may identify the new firmware file (e.g., a .hex file stored on the computer memory) as indicated in operation 910. The computer software program may then direct the uploading of the new firmware file to the microcontroller as indicated in operation 912. The computer program may be further designed to verify the upload completed successfully without errors. If no programming errors occurred, the software may indicate such, for example, by presenting a message indicating the upload has been "Verified." Alternatively, if errors are discovered, the software may be designed to display a "Failed" message, at which point the upload may be attempted again. Once the re programming is complete, the software program may be closed, the power disconnected, and the dongle may be disconnected from the switch leads as indicated in operation 914.

FIG. 10 presents a flow diagram of a real-time data transfer process 1000 that may be used to monitor the readings of the accelerometer on the potted circuit even after installation within an awning system. As discussed above, the control assembly configuration, including the accelerometer outputs and the microcontroller on the board are no longer directly accessible after the board is potted in the control assembly. Therefore, external access to data from the accelerometer or the microcontroller is impossible through the pins on the chips or elsewhere on the board. In order to overcome this dilemma, the circuit has been designed to allow for data transfer communications using the lead wires from the extend/retract switch.

Initially, a connection is established between the control leads and an interface bus on a computer as indicated in operation 1002. As described above, in one implementation, this connection may be established by a dongle using, for example, a Future Technology Devices International Ltd. FT232R USB to serial UART IC (www.ftdichip.com) with wire leads for connection to the battery ground, and to the extend and retract leads connected to and extending from the control assembly. The extend and retract wire leads may be disconnected from the control switch for this purpose. The USB end of dongle may then be connected to the computer.

The computer may be equipped with a specific software program for establishing communication with the microcontroller through the wire leads. Initially, the software establishes a connection with the USB to serial UART chip as indicated in operation 1004. This may be automatically or manually initiated. Next the power supply to the microcontroller is actuated as indicated in operation 1006. This may be accomplished by actuating the On/Off switch for the awning system or alternately by connecting the power supply leads from the control assembly to a separate switched power source (e.g., 12V DC) used for the purposes of the data transfer operation.

The firmware within the microcontroller may be designed to include a "listening window" upon initial power-up on the pins for the extend and retract leads in order to recognize attempts for data downloads as indicated in operation 1008. Within a short period after actuation of the power supply, e.g., within 1 to 2 seconds, a "ping" command may be automatically or manually initiated by the computer to indicate to the microcontroller that a communications link is requested. This establishes communication with the microcontroller and prevents the microcontroller from undertaking its normal control operations. The ping command may further include specific instructions or have a signature recognized by the microcontroller directing the microcontroller to begin downloading raw and processed accelerometer data. If a ping signal is not sent, the microcontroller will proceed to monitor wind conditions and operate the extend and retract functions either automatically or upon receipt of manually actuated signals.

Once communication between the microcontroller and the computer has been established, the computer may identify a data file (e.g., either new or existing) within the computer memory for storage of data received from the control assembly as indicated in operation 1010. The computer may then begin to receive the desired motion sensor data generated by the accelerometer and/or processed by the microcontroller as indicated in operation 1012. The software program may then direct the computer to process and graphically display the motion sensor data as indicated in operation 1014. In an exemplary implementation, the software may be configured to provide a streaming display of X, Y, Z, Short Average, and Long Average graphical data on the screen. The software program may further direct the computer to store the motion sensor data in the previously designated file (e.g., a .bin or .csv file) within the memory of the computer as indicated in operation 1016

The user can initiate a "Stop Capture" command within the software at any time to halt streaming and data capture as indicated in operation 1018. The user can restart the data capture and graphic display through the software as well by making a selection via the user interface as indicated in decision operation 1020. If the power to the control assembly is still "on", then there is no need to cycle the power off and on again to refresh the data display and collection feature. To end data capture, the user may simply close the software program, turn off the power supply, and disconnect dongle as indicated in operation 1022.

The technology described herein may be implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products that cause the instantiation of operations on a computer system to implement the invention. One implementation of a computer program product provides a computer program storage medium readable by a computer system and encoding a computer program. Another implementation of a computer program product may be provided in a computer data signal embodied in a carrier wave by a computing system and encoding the computer program. It should further be understood that the described technology may be employed in special purpose devices independent of a personal computer.

All directional references (e.g., proximal, distal, upper, lower, upward, downward, left, right, lateral, front, back, top, bottom, above, below, vertical, horizontal, clockwise, and counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understood that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A control system for controlling a motor for a retractable awning comprising
    a single accelerometer having three signal outputs indicating an acceleration of a leading edge of a retractable awning in three substantially orthogonal directions, each of the three substantially orthogonal directions corresponding to a respective one of said three signal outputs; and
    a processor that received the three signal outputs from the single accelerometer and determines, based upon comparison of a weighted average of the three signal outputs to a threshold value, whether to generate a retraction control signal for the motor that operates the retractable awning; wherein
    the control system, including both the single accelerometer and the processor, is contained in a single housing which is sized and configured for mounting on the leading edge of the retractable awning.

2. The control system of claim 1, wherein the threshold value corresponds to a wind gust condition.

3. The control system of claim 1, wherein the threshold value corresponds to a sustained gale condition.

4. The control system of claim 3, wherein the processor further monitors a length of time of the sustained gale condition and compares the length of time to a threshold time value, which must be exceeded by the length of time before the processor generates the retraction control signal.

5. The control system of claim 1, further comprising a first input lead configured for attachment to a switch for providing an extend signal recognized by the processor as an instruction to cause the motor to extend the retractable awning; and
    a second input lead configured for attachment to the switch for providing a retract signal recognized by the processor as an instruction to cause the motor to retract the retractable awning; wherein
    the processor is configured to both receive and transmit data over either the first input lead, the second input lead, or both.

6. The control system of claim 5, wherein the processor is configured to enter a listening window for a period of time upon power instantiation to received firmware updates or other instructions via the first or second input lead before executing the instruction to cause the motor to extend the retractable awning or the instruction to cause the motor to retract the retractable awning.

7. The control system of claim 1, wherein the accelerometer having three signal outputs indicating an acceleration of a leading edge of a retractable awning in three orthogonal directions comprising a horizontal direction, a vertical direction, and a lateral direction relative to the leading edge of said retractable awing;
    said accelerometer further comprising a static component for measuring static acceleration of gravity and a dynamic component for measuring motion in said retractable awning.

8. The control system of claim 7, wherein the threshold value corresponds to a wind gust condition.

9. The control system of claim 7, wherein the threshold value corresponds to a sustained gale condition.

10. The control system of claim 9, wherein the processor further monitors a length of time of the sustained gale condition and compares the length of time to a threshold time value, which must be exceeded by the length of time before the microcontroller generates the retraction control signal.

11. The control system of claim 7, wherein the processor and the accelerometer are elements of a circuit; and
the circuit further comprises a current monitor that transmits current draw data measured on a lead to the motor to the processor for determination of a motor stall event; and wherein
the processor is configured to disconnect power to the motor upon determination of a motor stall event.

12. The control system of claim 11, wherein the processor is configured to restart the motor after a power disconnect to the motor if the retraction control signal was generated in response to the signal outputs from the accelerometer.

13. The control system of claim 1, wherein the processor further stores a maximum retraction time value and is configured to disconnect power to the motor if an actual operation time of the motor during a retraction awning exceeds the maximum retraction time value.

14. A retractable awning comprising
a roller;
a canopy attached along a first edge to the roller, wherein the canopy furls and unfurls about the roller;
a pair of support arms that extend and retract and are mounted at first ends to a stable surface and support the canopy at second ends when the canopy is unfurled and the support arms are extended;
a motor that drives the roller to furl and unfurl the canopy about the roller and thereby extend and retract the support arms;
a lead rail supported by the second ends of the pair of support arms;
a multidimensional motion detector having two or more signal outputs indicating an acceleration of a leading edge of a retractable awning in at least directions; and
a microcontroller that receives the signal outputs from the multidimensional motion detector and determines, based upon comparison of the signal outputs to a threshold value, whether to generate a retraction control signal for the motor; wherein
the multidimensional motion detector and the microcontroller are components of a singular motor control unit contained in a single housing and mounted on the lead rail; further wherein the multidimensional motion detector comprises a single accelerometer having three signal outputs indicating an acceleration of a leading edge of the lead rail in three substantially orthogonal directions; and
the microcontroller receives the three signal outputs from the accelerometer and determines, based upon comparison of a weighted average of the signal outputs to the threshold value, whether to generate a retraction control signal for the motor.

15. The retractable awning system of claim 14, wherein the roller and the motor are configured to fixedly mount on or adjacent to the stable surface.

16. The retractable awning system of claim 14, wherein the roller and the motor are supported by the second ends of the pair of support arms adjacent to the lead rail.

17. The retractable awning system of claim 16, wherein the singular motor control unit is mounted in a motor head assembly that houses the motor in linkage with the roller.

18. The retractable awning system of claim 17 further comprising a first input lead configured for attachment to a switch for providing an extend signal recognized by the microcontroller as an instruction to cause the motor to extend the retractable awning; and
a second input lead configured for attachment to the switch for providing a retract signal recognized by the microcontroller as an instruction to cause the motor to retract the retractable awning; wherein
the microcontroller is configured to both receive and transmit data over either the first input lead, the second input lead, or both.

19. The control system of claim 1, wherein the control system is a potted device.

20. The control system of claim 14, wherein the singular motor control unit is a potted device.

21. The control system of claim 1, wherein the single accelerometer and the processor of the control system are mounted on a single circuit board.

22. The control system of claim 14, wherein the single accelerometer and the microcontroller of the singular motor control unit are mounted on a single circuit board.

23. The control system of claim 14 wherein said microcontroller further comprises a failsafe counter to resume operation of said motor upon experiencing a motor stall.

24. The control system of claim 14 wherein said microcontroller further comprises an interface for collecting at least one of real-time accelerometer data and historical accelerometer data by a remote personal computer.

25. A control system for controlling a motor for a retractable awning comprising
a single accelerometer having three signal outputs indicating an acceleration of a leading edge of a retractable awning in three substantially orthogonal directions, each of the three substantially orthogonal directions corresponding to a respective one of said three signal outputs; and
a processor that received the three signal outputs from the single accelerometer and determines, based upon comparison of the three signal outputs to a threshold value, whether to generate a retraction control signal for the motor that operates the retractable awning; wherein
the control system, including both the single accelerometer and the processor, is contained in a single housing which is sized and configured for mounting on the leading edge of the retractable awning; wherein the single accelerometer having three signal outputs indicating an acceleration of a leading edge of a retractable awning in three orthogonal directions comprising a horizontal direction, a vertical direction, and a lateral direction relative to the leading edge of said retractable awning;
said accelerometer further comprising at least one of a static component for measuring static acceleration of gravity and a dynamic component for measuring motion in said retractable awning;
the processor receives the three signal outputs from the accelerometer and determines, based upon comparison of a weighted average of the three signal outputs to the threshold value, whether to generate a retraction control signal for the motor that operates the retractable awning.

* * * * *